J. G. LEYNER & S. A. KNOWLES.
MUCKER FOR REMOVING ORE, ROCK, DIRT, AND OTHER MATERIAL FROM TUNNELS.
APPLICATION FILED APR. 19, 1910.
1,000,336.
Patented Aug. 8, 1911.
5 SHEETS—SHEET 1.
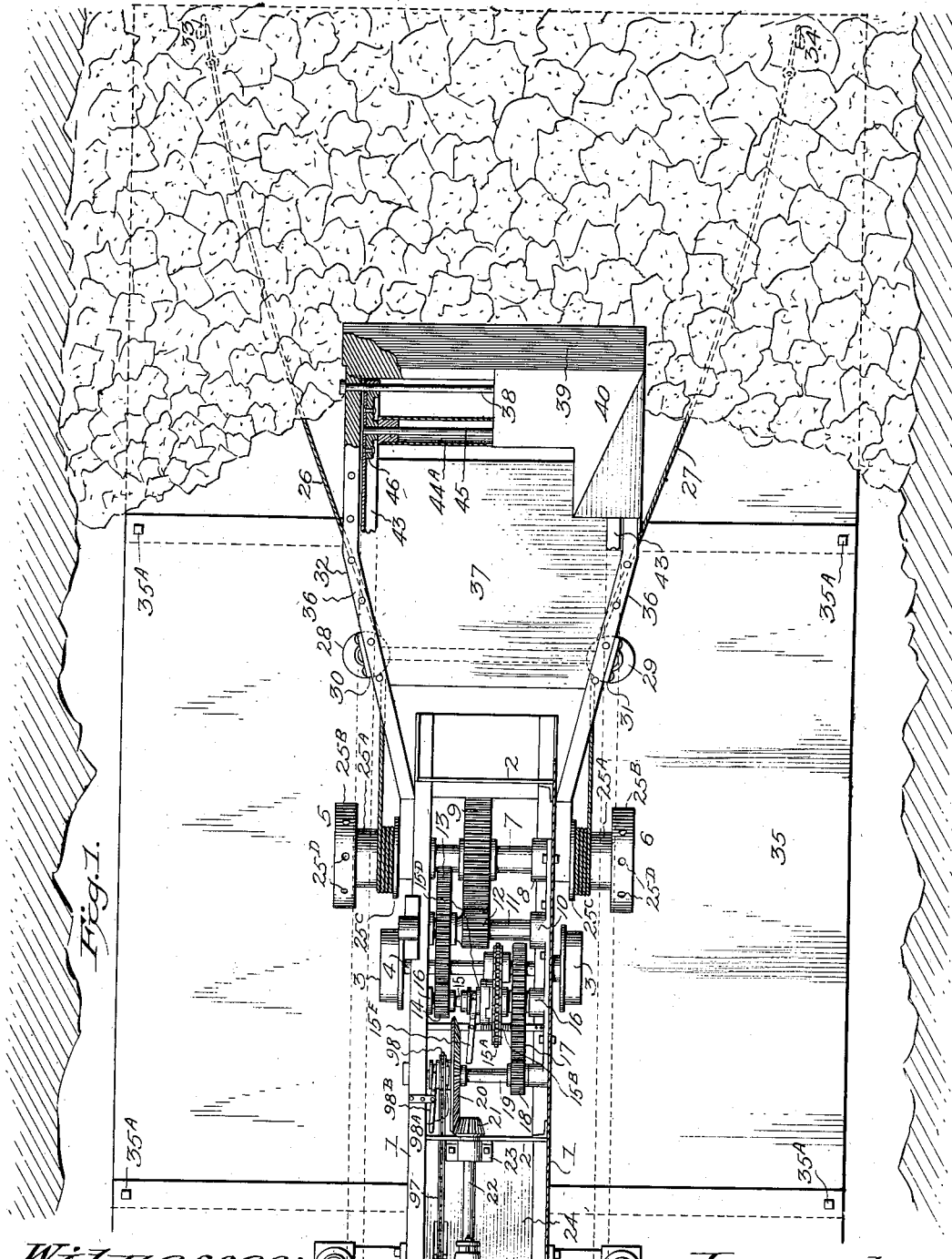

J. G. LEYNER & S. A. KNOWLES.
MUCKER FOR REMOVING ORE, ROCK, DIRT, AND OTHER MATERIAL FROM TUNNELS.
APPLICATION FILED APR. 19, 1910.
1,000,336.
Patented Aug. 8, 1911.
5 SHEETS—SHEET 2.
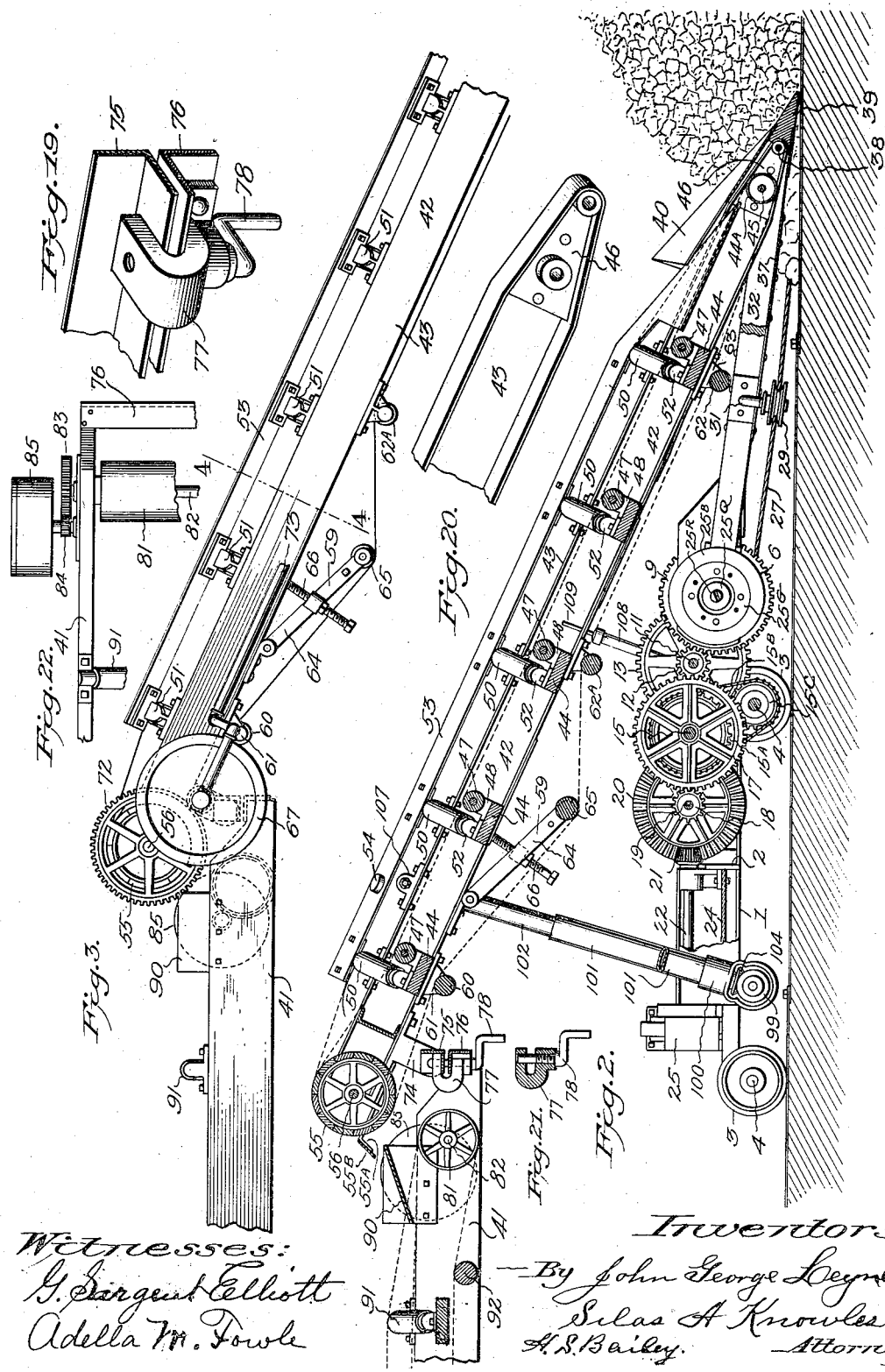

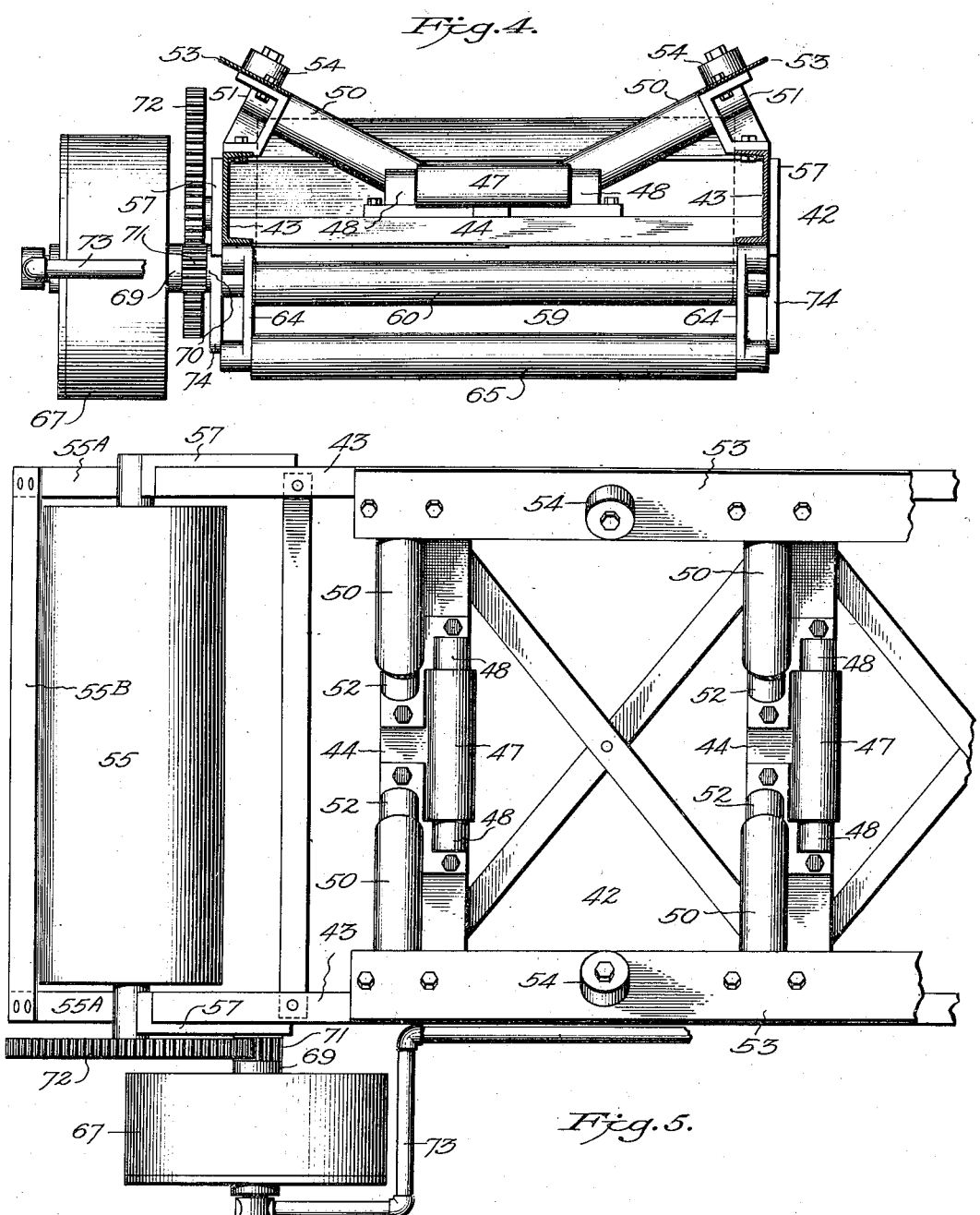

J. G. LEYNER & S. A. KNOWLES.
MUCKER FOR REMOVING ORE, ROCK, DIRT, AND OTHER MATERIAL FROM TUNNELS.
APPLICATION FILED APR. 19, 1910.
1,000,336.
Patented Aug. 8, 1911.
5 SHEETS—SHEET 4.
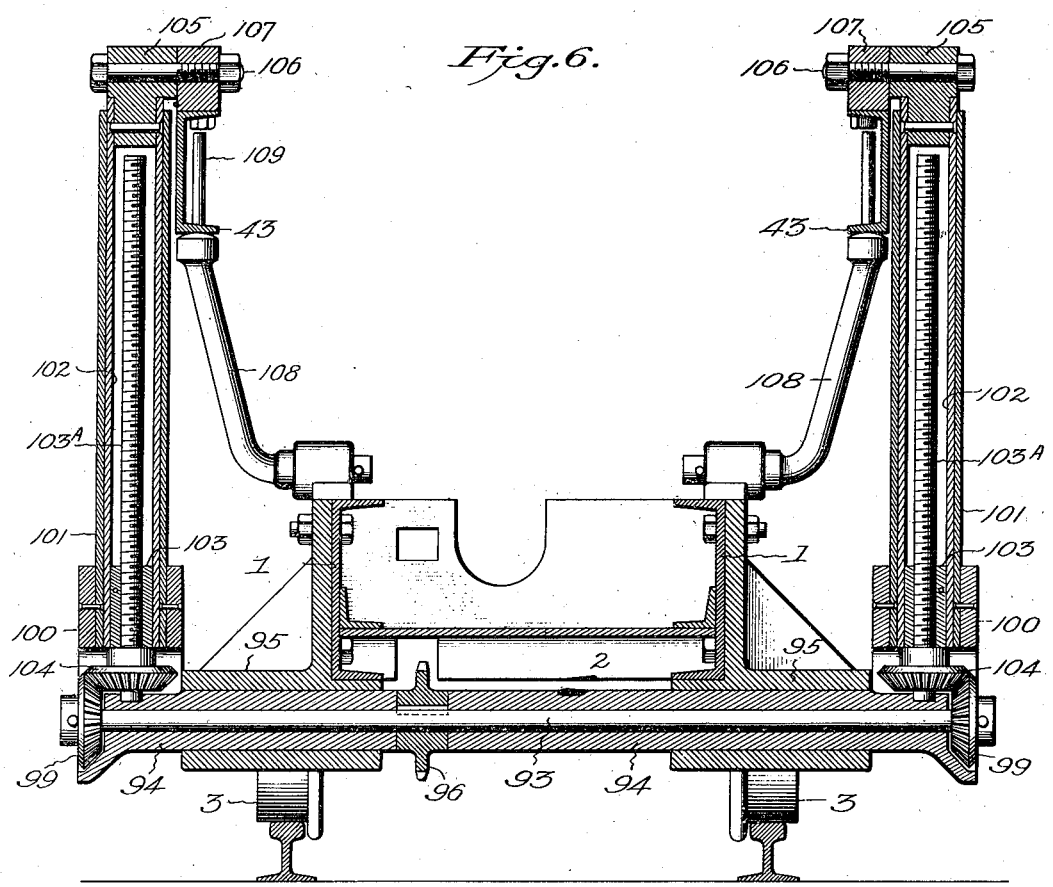

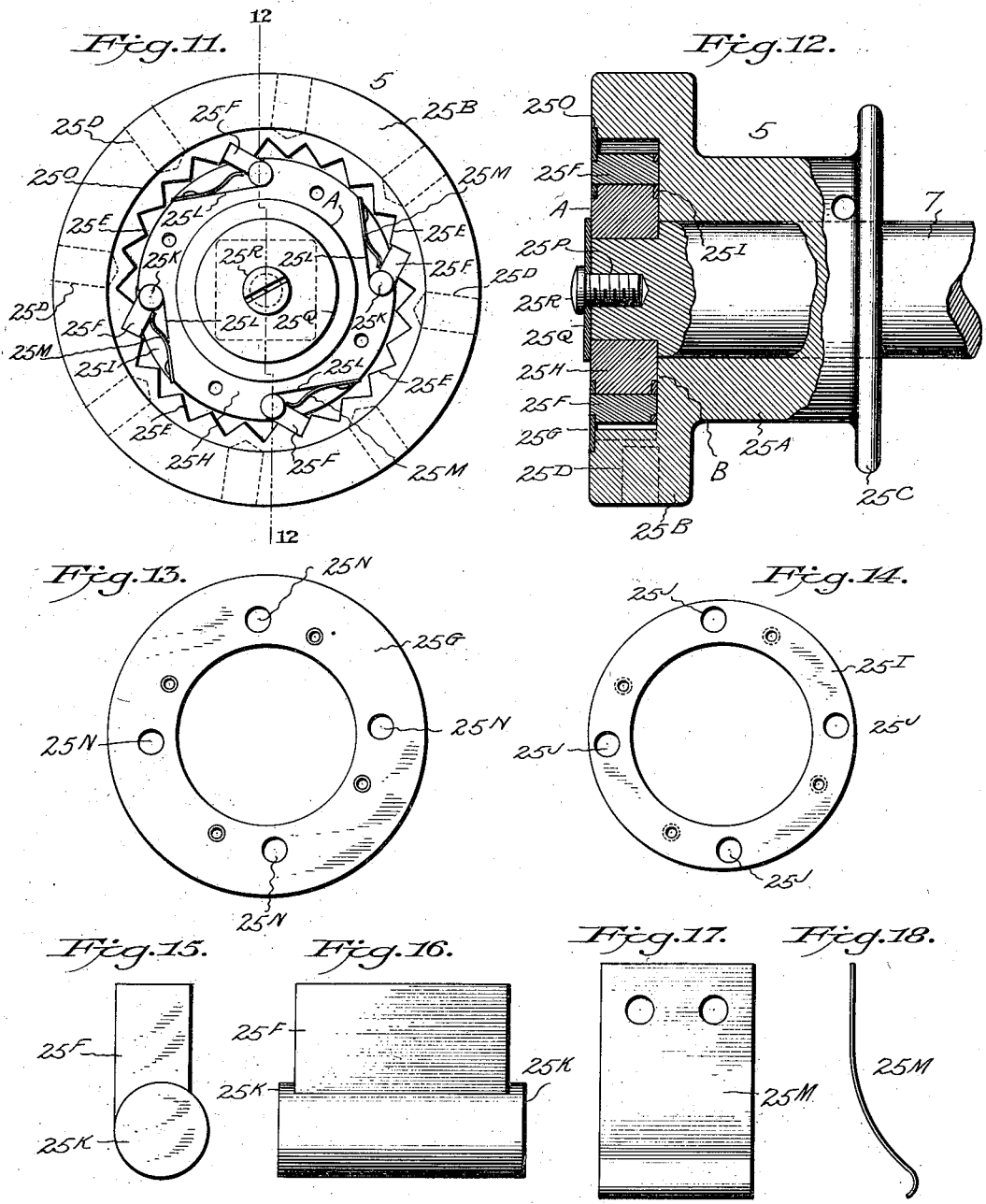

UNITED STATES PATENT OFFICE.

JOHN GEORGE LEYNER, OF DENVER, AND SILAS A. KNOWLES, OF GOLDEN, COLORADO, ASSIGNORS OF THREE-FOURTHS TO THE J. GEORGE LEYNER ENGINEERING WORKS COMPANY, OF DENVER, COLORADO, A CORPORATION OF COLORADO.

MUCKER FOR REMOVING ORE, ROCK, DIRT, AND OTHER MATERIAL FROM TUNNELS.

1,000,336.    Specification of Letters Patent.    Patented Aug. 8, 1911.

Application filed April 19, 1910. Serial No. 556,327.

*To all whom it may concern:*

Be it known that we, JOHN GEORGE LEYNER and SILAS A. KNOWLES, the former a citizen of the United States of America, residing in the city and county of Denver and State of Colorado, and the latter a citizen of the United States of America, and resident of Golden, county of Jefferson, State of Colorado, have invented a new and useful Mucker for Removing Ore, Rock, Dirt, and other Material from Tunnels, of which the following is a specification.

Our invention relates to a new and improved mucker for removing material from the breasts of tunnels, such as ore, rock, gravel, and dirt, or muck, which is a term applied to a mixture of all or a part of all of these materials; and the objects of our invention are: First: to provide a machine for removing and depositing in cars the rock, ore, dirt, or muck, thrown down at the breast of tunnels by blasting when driving tunnels in mining, or railroad, or other operations; second: to provide an endless belt automatic shoveling and car loading machine; and third: to provide a rock, ore, or dirt removing machine that can be easily handled and adjusted to be forced directly under the body of rock, ore, muck, or dirt material at the breasts of tunnels. We attain these objects by the mechanism illustrated in the accompanying drawings, in which:

Figure 1, is a plan view of the supporting truck of our improved machine, a fragment only of the inclined conveyer frame, which is pivotally connected to the forward end of the truck, being shown. Fig. 2, is a view of the machine showing the truck partly in elevation and partly in section, while the inclined or main conveyer frame and the supplemental conveyer frame are shown in section. Fig. 3, is a side elevation of a portion of the main and supplemental conveyer frames. Fig. 4, is a transverse sectional view through the main conveyer frame, showing the belt-supporting rollers, the belt tightener, and the engine and gears for operating the belt. Fig. 5, is a plan view of the rear portion of the main conveyer frame. Fig. 6, is a transverse sectional view through the truck and conveyer frame, illustrating the mechanism for raising and lowering the conveyer frame, and for supporting it in its lowered position. Fig. 7, is a plan view of one of the sleeves which support a shaft having a beveled gear at each end, as shown in Fig. 6, which mesh with other gears to effect the raising and lowering of the conveyer frame. Fig. 8, is a plan view of one of the hubs secured to the side of the truck, for supporting the sleeve shown in Fig. 7. Fig. 9, is a front elevation of the sleeve shown in Fig. 7. Fig. 10, is a front elevation of the hub shown in Fig. 8. Fig. 11, is a front view of one of the capstans, around which the operating cables or ropes are wound, the front pawl-bearing ring being removed, and the pawls being shown supported by a ring, and engaging ratchet teeth formed on the periphery of a recess formed in the capstan. Fig. 12, is a view of the capstan partly in side elevation, and partly in section, on the line 12—12 of Fig. 11. Fig. 13, is an elevation of the outer ring, in which the pawl trunnions have bearings. Fig. 14, is an elevation of the inner ring in which the trunnions of the pawls have bearings. Fig. 15, is an end view of one of the pawls. Fig. 16, is a front view thereof. Fig. 17, is a front view of the pawl-actuating spring. Fig. 18, is an edge view thereof. Fig. 19, is a perspective view of the yoke which forms the pivotal connection between the main and supplemental conveyer frames, the yoke being pivotally connected to angle bars which are connected respectively to the ends of the two frames. Fig. 20, is a perspective view of the lower end of one of the side beams of the main conveyer frame. Fig. 21, is a sectional view through the yoke shown in Fig. 19, and Fig. 22, is a plan view of a fragment of that end of the supplemental conveyer which is connected to the inclined conveyer.

Similar letters of reference refer to similar parts throughout the several views.

Referring to the drawings, the frame of our mucker consists of the side beams 1, and the cross pieces 2; the side beams being preferably made of structural iron and the cross pieces are also preferably made of structural iron. This frame is preferably mounted on car wheels 3, which are rotatably mounted on axles, 4, which are secured to the under side of the front and rear end portions of the frame.

To the front end of the machine, we secure two capstans 5 and 6, arranging them horizontally one on each side of the machine, on the opposite ends of a shaft 7, which is journaled in suitable boxes 8, which are secured to the side beams 1. Upon the center of the shaft 7, we secure a gear 9. Parallel to the shaft 7, we mount in suitable boxes 10, a shaft 11; upon the central portion of this shaft 11, we secure a pinion 12, which meshes with the gear 9. At the side of the pinion 12, we secure a gear 13, which meshes with a pinion 14. This pinion 14 is secured to a shaft 15, which is revolubly journaled in boxes 16, that are secured to the frame of the machine in any suitable manner. We also secure to the shaft 15, a gear 17, which meshes with a pinion 18, that is secured to shaft 19. We also secure to the shaft 19 a bevel gear 20, which meshes with a bevel pinion 21. This bevel pinion 21 is secured to a shaft 22, that is revolubly mounted in boxes 23, that are secured to a platform 24, which is attached to the side beams of the frame. This shaft is connected in any suitable manner to any suitable engine or motor, but I preferably use, however, a rotary reversible Dake engine, 25, as it is very compact, and the shaft 22, is connected directly to the center disk of the engine. This engine is mounted upon and is secured in any suitable manner to the frame of the machine. The engine 25, thus drives the train of gears above enumerated and rotates the capstans 5 and 6.

Upon the shaft 15, is loosely mounted a sprocket wheel 15$^A$, which is connected by a chain 15$^B$ with a sprocket wheel 15$^C$, rigidly mounted on the forward supporting axle 4 of the wheel frame. The sprocket 15$^A$ has a clutch face, which is normally engaged by a clutch 15$^D$ on the shaft 15, so that the power from the shaft 15 will be transmitted to the sprocket 15$^C$, by means of the chain 15$^B$ to move the machine either forward or backward; but when it is desired to raise or lower the inclined conveyer frame, the clutch 15$^D$ is thrown out of engagement with the sprocket wheel 15$^A$, as will hereinafter be fully shown. The clutch is operated by means of a lever 15$^E$.

The capstans each comprise a drum 25$^A$, and two flanged portions 25$^B$ and 25$^C$. One flange 25$^B$ of each drum, is made wide enough to contain a circumferential row of holes 25$^D$, that are adapted to receive one end of a lever, by which they may be turned by hand when necessary. The capstans are loosely mounted on the shaft 7, and are provided with a pawl and ratchet mechanism, which is arranged so that the engine normally operates the capstans, but at the same time allows either one of them to be rotated to draw on the rope independently of the other, and of the engine and train of gears. We preferably construct this mechanism as follows: In the wide flanged end 25$^B$ of each capstan, we form a counterbore, the inner periphery of which is provided with ratchet teeth 25$^E$, which are engaged by a plurality of pawls 25$^F$; these pawls are supported by three flange rings 35$^G$, 25$^H$, and 25$^I$. The ring 25$^I$ rests against the inner wall of the counter-bore. This flange ring contains a round aperture larger than the shaft, and it is provided with apertures 25$^J$, which form bearings for the trunnions 25$^K$, on the inner ends of the pawls. The flange ring 25$^H$ contains a square aperture, that fits on a square surface formed on the opposite ends of the shaft. Its peripheral surface is divided into steps 25$^L$, to form seats for the pawls, and the shoulder of each step contains a curved recess in which the back ends of the pawls are seated. A spring 25$^M$, is secured to each step, and extends under each pawl, and holds it in operative engagement with the ratchet teeth. We preferably use four pawls, as illustrated. The trunnions on the outer ends of the pawls are journaled in apertures 25$^N$, formed in the flange ring 25$^G$, and the apertures 25$^J$ in the ring 25$^I$. This flange ring 25$^G$ fits against the side of the pawl supporter 25$^H$, and over a circular projection or hub A, formed on the side of the pawl supporter, a corresponding projection B, being formed on the opposite side, which extends through the central opening in the ring 25$^I$. The ring 25$^G$ fits into a counterbore 25$^O$ formed in the entrance of the drum. These flange rings 25$^G$ and 25$^I$ are secured by screws to the opposite sides of the flange ring 25$^H$. In the opposite ends of the shaft 7, we form threaded apertures 25$^P$, and upon the ends of the shaft we place washers 25$^Q$, which we secure by screws 25$^R$, that extend through the washers and are threaded into the threaded apertures in the ends of the shaft. These washers overlie the square apertures in the pawl supporter, and thus hold the capstans upon the ends of the shaft. To the drums, we secure the ends of two ropes 26 and 27, and each rope extends from its drum over two horizontally positioned sheaves 28 and 29, which are mounted in suitable boxes 30 and 31, that are secured to a forward extension 32, of the wheel frame, and which we term the shoveling ram. As our machine is adapted to be used at the breasts of tunnels for removing and depositing in cars the rock, ore, dirt, or muck, that is thrown down in blasting, we have illustrated it in plan and elevation in operative position at the breast of a tunnel, and the two ropes extend forward from the sheaves and are anchored to pins 33 and 34, which are secured to a foundation plate 35. This foundation plate comprises two heavy plates of iron that are detachably bolted together at their meeting ends by bolts 35$^A$. These plates form a smooth surface for the lip of the shoveling ram to slide on, as it is forced forward under the ore or rock or other material knocked down at the breast of the tunnel. This shoveling ram portion comprises an iron frame, which consists of the side beams 36, which are connected by a bottom plate 37, and a bolt 38. This bolt extends through the front end portion of the shovel. To the outer end of this frame we secure a wedge shaped forging 39, which forms a shoveling lip. This lip and the frame of the shoveling ram are covered by a heavy sheet steel plate 40, for a portion of their lengths, and the sides of this plate are sloped upward and inward from a point adjacent to the edge of the lip of the shoveling ram, so as to form a trough that will guide the rock, ore, dirt, or muck into the center of the ram, as the ram is forced over the surface of the plate under the material, as will be explained more fully hereinafter. On the bolt 38, we pivotally mount one end of an endless belt frame 42, which consists of the side pieces 43 and the cross pieces 44. This endless belt frame extends rearward from the bolt 38, over and beyond the wheeled frame of the machine, and its rear end is supported and arranged to be raised and lowered over the wheeled frame to stand at any desired angle to convey the rock, ore, dirt, or muck to its upper end, and discharge it directly into cars or preferably into a supplementary conveyer 41, that will convey and discharge it into cars, as will be described more fully hereinafter. In the belt conveyer frame adjacent to its pivotal bolt 38, and under the shovel plate, we rotatably mount a roller 44^A, on a shaft 45, the ends of which are rotatably supported in a steel or iron casting or a forging 46, which is secured to the side pieces of the frame of the belt conveyer, and through the ends of which the pivotal bolt 38, passes, and along the center of the length of the belt conveyer frame at suitable distances apart to support a belt, we mount a plurality of rollers 47, in boxes 48, which are attached to the cross pieces 44, of the frame, and on each side of each of these central rollers, we rotatably mount an inclined roller 50, which rollers are positioned at an upward angle from adjacent to the opposite ends of each of the center rollers to the side beams of the belt conveyer frame, where their outer ends are journaled in suitable boxes 51, which are secured to the side beams of the frame. The inner ends of these inclined rollers are also journaled in boxes 52, which are secured to the cross pieces 44. Upon the tops of the boxes 51, are secured strips 53, which support the side edges of the belt, between the rollers 50. These strips are connected at their forward ends by an integral plate, which is adapted to lie beneath the conveyer belt and supports it against sagging as the heavy material falls upon it, that portion of the belt having to sustain the greatest strain. Guide rollers 54, are secured near the ends of these strips, which guide the belt over a drum 55, which is mounted on a shaft 56, that is journaled in boxes 57, that are secured to the side rails at the outer end of the belt conveyer frame.

On the rollers 56, 50, 47, and 44^A, we place a suitable belt, which in running over the introverted inclined rollers forms a trough shaped conveyer, that holds the rock, ore, dirt, or muck in its center without spilling it over its sides. In order to prevent the under side of the belt from sagging, we journal a roller 60, across the frame, and below it to its side rails at a short distance from the drum 56, in boxes 61, and at the front end of the frame at a short distance from the roller 44^A, we journal a roller 62, below the frame to its side rails in boxes 63, positioning them low enough below the frame so that the belt will run over them and between them and the under side of the frame, and a similar roller 62^A is placed at a suitable point between the rollers 60 and 62. The belt is kept tight by a belt stretcher or tightener 59, which is secured to the under side of the frame centrally between the rollers 60 and 62^A, and while any suitable type of a belt stretcher may be used, we preferably employ a frame comprising arms 64, which are pivoted at one end to the under side of the conveyer belt frame. The opposite ends of the arms carry a roller 65, over the lower surface of which the belt runs. Adjustable screws 66, are threaded to the arms intermediate of their ends, the points of which bear against the frame, while the opposite ends are adapted to receive a wrench. In order to operate the belt, we preferably employ an independent motor, from that used to operate the wheeled bed frame of the machine, and while we may use any suitable motor or engine for this purpose, we preferably use a rotary engine 67, and mount it on the conveyer belt frame in any suitable manner. The outer end of the driving shaft 69, of this engine. is journaled in a box 70, that is secured to the adjacent side of the conveyer frame, and a pinion 71, is secured to, or formed on this shaft. This pinion engages a gear 72, which is secured to the end of the shaft 56, of the drum 55, which projects beyond its boxes 57. We place the throttle valve of the motor 67, on the carriage frame, and preferably connect this valve to the motor by a hose 73. The conveyer belt of the shovel is thus driven to elevate the material shoveled into it by the motor 67, which is attached directly to the conveyer. Arms 55^A, are suitably secured to the side beams of the inclined frame, and extend out beyond the drum 55, their ends being turned down at an angle, and to these ends is secured a strip 55ᴮ, which lies parallel with and close to the drum 55, and acts both as a scraper to free the belt from any material that might adhere to it, and also as a chute for the ore or rock.

The conveyer can discharge directly into a car if desired, but we preferably use a supplementary or car-loading conveyer 41, which is connected directly to this inclined conveyer and which is substantially like it in construction, but is connected to it in the following manner: Upon the under side of the boxes 57 at the end of the inclined conveyer, are formed depending ears 74, between which is pivotally secured an angle bar 75; the pivot bolts passing through the ears, and through an upturned end of the angle bar. A similar angle bar 76, is rigidly secured to the end of the supplemental conveyer, and the angle bars are pivotally connected centrally of their lengths by a yoke 77, having a crank pin 78, which passes up through the yoke, and through the adjacent members of the angle plates. The crank pin is held in place by being threaded to the lower member of the yoke. (See Fig. 21.) These two pivotal connections between the inclined shovel conveyer and the loading conveyer form a universal joint that permits the loading conveyer to be moved vertically and horizontally. The opposite end of this conveyer is thus free to be moved in any direction, and to be rested on an ore car until it is loaded. An endless belt, preferably of rubber, is operatively mounted on rollers 81, which are secured to shafts 82, that are mounted in boxes that are secured to the side rails at their opposite ends. The forward shaft 82, extends beyond the side rail at one side of this conveyer, and is provided with a gear wheel 83, which meshes with a pinion 84, on the shaft of a motor 85, of any suitable type, which is mounted on the side rail and is operatively arranged to drive the belt. The throttle valve of this engine is placed on the carriage, and is connected to the engine by a suitable hose.

A hopper or chute 90 is secured to the side rails of the loader conveyer in a position to receive the discharging material from the shovel belt. This hopper is provided with converging sides that guide the ore into the central portion of the loader belt. The upper running portion of this loader runs over inclined rollers 91, which are constructed and positioned at suitable intervals along its length the same as on the shovel belt, and its lower portion runs over straight or horizontally arranged rollers 92, which are positioned adjacent to the opposite ends of the conveyer.

The inclined belt is raised and lowered by means of a telescopic screw and bevel gear mechanism, that is operated by the engine 25 of the carriage, which we preferably construct in the following manner: A shaft 93 is mounted transversely across the carriage close to the engine 25 in a hollow sleeve 94, which is supported by hubs 95 that are secured on the opposite side rails of the carriage. A sprocket wheel 96, is secured to the central portion of this shaft, and is connected by a chain 97, with a sprocket wheel 98, mounted on the shaft 19. The sprocket 98, is provided with a clutch 98ᴬ, which engages a clutch face on the hub of the bevel gear wheel 20. These clutches are normally out of engagement, but are moved into engagement when it is desired to raise or lower the inclined conveyer frame, and when this is being done, the clutch 15ᴰ is thrown out of engagement with the sprocket 15ᴬ on shaft 15, so that the machine will remain stationary. The clutch 98ᴬ is operated by a lever 98ᴮ. Bevel gears 99, are secured to the shaft 93, beyond the opposite ends of its journal bearing. Vertical hubs 100, are formed on the opposite ends of the hollow sleeve 94, in which vertical tubes 101 are secured. Inside of these tubes 101, tubes 102, are slidably mounted, and to the lower ends of these tubes nuts 103 are secured. A long threaded shaft 103ᴬ is threaded through the nut of each tube, and to the lower end of each threaded shaft a bevel gear 104 is secured, which is arranged to mesh with the adjacent bevel gear 99. The upper end of the tubes 102, are connected to lugs 105, which are pivotally connected by bolts 106, to lugs 107, that are secured to the opposite side rails of the inclined conveyer. To the tops of the side rails of the opposite sides of the carriage, two resting arms 108 are pivotally secured, the opposite ends of which are arranged to extend under the opposite side rails of the inclined conveyer when it is lowered to its lowest position, when its weight rests on these supporting arms. Short guide rods 109, extend from the upper ends of the arms 108, and pass through holes in the side beams of the inclined frame, and assist in steadying the movement of the frame when it is raised or lowered.

The operation of our improved mucker, is as follows: We preferably use compressed air, as the motive actuating fluid, and the several motors on the mucker are operatively connected to a suitable supply of it. The breast of rock is drilled with a sufficient number of holes to blast its entire surface, and they are charged ready to be fired, but before a charge is fired, the floor plates 35, are laid down, and the ropes are hooked to the eye pins 33 and 34 in the forward plate; while the mucker is run back a safe distance. The breast is then fired, and the ore and rock fall onto the floor plates on the ropes. The mucker is then run up on the plates by starting the engine, which at the same time winds up the rope, and forces the ram or shovel under the ore or rock. The inclined conveyer is then elevated to the desired angle by throwing in the clutch that connects the sprocket wheel 98 on shaft 19, with the sprocket wheel 96 on shaft 93, by means of chain 97. The ram of the mucker is then forcibly drawn under the fallen ore or rock by the engine, which through the medium of the train of gears causes the shaft and pawls to rotate the capstans, which wind the rope slowly and draw the ram of the mucker under the ore or rock, which is carried up over the end of the inclined conveyer by the endless belt, which is driven by its individual motor 67. The inclined conveyer discharges the ore and rock into the hopper of the car loading belt, from which it discharges onto the loader, which is driven by its own individual motor 85, and discharges it into a car. The mucker can be thus drawn forward under the ore or rock by the ropes until the ram reaches the breast of the tunnel and all or the greater portion of the ore or rock will be automatically shoveled up and loaded into cars, while the small amount remaining at the sides of the tunnel can be shoveled onto the endless inclined belt by a man on each side of the mucker. When desired, a lever can be inserted in either one of the capstans and they can be turned independently to even up the ropes 26 and 27, so that they will be of equal length, thus causing the pull to come in direct line with the machine. The capstans can also be turned to wind the rope, when the engine is shut down by turning the train of gears and the engine.

Our invention will very greatly lessen the time and expense required to remove the ore or rock from the breast of a tunnel after blasting, as the machine is easily and quickly manipulated, and is capable of removing a great amount of ore or rock in a short time, while to accomplish the same results manually would require several men, working a much longer time.

While we have illustrated and described the preferred construction and arrangement of our mucker, we do not wish to be limited to the construction shown and described, as many changes might be made without departing from the spirit of our invention.

Having described our invention, what we claim as new and desire to secure by Letters Patent, is:

1. In a mucker for removing rock-muck from the floors of tunnels at their breast portions, the combination of floor plates adapted to cover the floor of a tunnel at and adjacent to its breast portion; means for securing said plates together at their meeting edges; projecting pins on the edge of the plate that lies against the breast of said tunnel; a motor driven car adapted to rest and move on said plates, said car being provided with a shoveling ram, the lip of which is adapted to rest on said floor plates; cable winding drums on said car arranged to be operated in unison or independent of each other; means for operating said cable winding drums; cables secured at one of their ends to said drums and at their opposite ends to the projecting pin portions of said plates, and means for conveying the muck from said shoveling ram, whereby the winding up of said cables together or independently of each other forces the car and its shoveling ram forward on and against said floor plates to the breast of said tunnel.

2. In a mucker, the combination with a motor-propelled car, having a shoveling ram at its forward end; of a vertically adjustable inclined frame pivoted at one end adjacent to said ram; a drum at each end of said frame; a series of oppositely inclined rollers arranged in pairs across said frame; a horizontal roller adjacent to the inner ends of each pair of inclined rollers; a series of horizontal rollers beneath said frame; inclined guide strips on the sides of said frame, beyond the outer ends of the inclined rollers, which are connected near the pivoted end of the frame by an integral plate; an endless belt supported upon the drums, the inclined and horizontal rollers and the integral plate of said side strips; and means for operating said conveyer.

In testimony whereof we affix our signatures in presence of two witnesses.

JOHN GEORGE LEYNER.
SILAS A. KNOWLES.

Witnesses:
G. SARGENT ELLIOTT,
ROBERT J. WALTMAN.